US007150171B2

(12) United States Patent
Hellgren

(10) Patent No.: US 7,150,171 B2
(45) Date of Patent: Dec. 19, 2006

(54) PRESSURE CELL PRESS COMPRISING A TRAY, AND A METHOD FOR MANUFACTURING SAID TRAY

(75) Inventor: Keijo Hellgren, Västerås (SE)

(73) Assignee: Avure Technologies AB, Vasteras (SE)

( * ) Notice: Subject to any disclaimer, the term of this patent is extended or adjusted under 35 U.S.C. 154(b) by 0 days.

(21) Appl. No.: 10/516,425

(22) PCT Filed: May 15, 2003

(86) PCT No.: PCT/SE03/00789

§ 371 (c)(1), (2), (4) Date: Aug. 16, 2005

(87) PCT Pub. No.: WO03/099484

PCT Pub. Date: Dec. 4, 2003

(65) Prior Publication Data

US 2006/0123863 A1 Jun. 15, 2006

(30) Foreign Application Priority Data

May 27, 2002 (SE) .................................... 0201574

(51) Int. Cl.
*B21D 22/12* (2006.01)
*B29C 17/04* (2006.01)
*B30B 5/02* (2006.01)

(52) U.S. Cl. .............................. 72/63; 72/455; 72/446; 72/60; 100/278

(58) Field of Classification Search .................... 72/56, 72/60, 63, 446, 455; 100/278
See application file for complete search history.

(56) References Cited

U.S. PATENT DOCUMENTS

| | | | | |
|---|---|---|---|---|
| 2,771,850 A | | 11/1956 | Wheelon | 113/44 |
| 4,573,335 A | * | 3/1986 | Persson | 72/63 |
| 4,658,618 A | * | 4/1987 | Hellgren | 72/63 |
| 4,676,086 A | * | 6/1987 | Hellgren | 72/63 |
| 4,693,103 A | * | 9/1987 | Hellgren | 72/63 |
| 4,711,111 A | * | 12/1987 | Hellgren | 72/63 |

FOREIGN PATENT DOCUMENTS

| | | |
|---|---|---|
| SE | 452 436 | 11/1987 |
| WO | WO 02/43890 A1 | 6/2002 |

* cited by examiner

*Primary Examiner*—David B. Jones
(74) *Attorney, Agent, or Firm*—Harness, Dickey & Pierce, P.L.C.

(57) ABSTRACT

The present invention relates to a press of pressure cell type, a tray for use in a press of pressure cell type and a method. The tray comprises a tray frame, which defines a space for arranging a forming tool and/or a work-piece. Prestressing means are arranged on the external surface of the tray frame and induce a compressing prestress which acts in planes parallel to the plane of the tray. The tray frame presents a curvature along its entire circumference.

41 Claims, 4 Drawing Sheets

PRESSURE CELL PRESS COMPRISING A TRAY, AND A METHOD FOR MANUFACTURING SAID TRAY

FIELD OF THE INVENTION

The present invention relates to a press of pressure cell type, a tray for use in a press of pressure cell type and a method for manufacturing such a tray.

BACKGROUND ART

A press of pressure cell type generally comprises a force-absorbing press body which defines a press chamber. In the upper part of the press chamber, a press plate and a diaphragm of rubber or another resilient material are arranged, which together form a pressure cell. The pressure cell communicates with a source of pressure and expands when a pressure medium is supplied. In the lower part of the press chamber, a structural support or a tray is arranged, which comprises a bottom plate having a tray frame. The tray supports a working tool or a forming tool, a workpiece, a mat of rubber or another resilient material, covering the forming tool and the workpiece.

Presses of pressure cell type are used, among other things, when forming sheet-shaped blanks, for example sheets of steel or aluminum, for short series products within the aircraft industry and the motor industry. The sheet is placed in the press in such a manner that one of its sides faces a forming tool. The resilient diaphragm is arranged on the other side of the sheet. A closed space between the diaphragm and the press plate located above the diaphragm constitutes the pressure cell and this space is filled during the forming process with a pressure medium. By pumping additional pressure medium into the pressure cell, the pressure is increased in the pressure cell and the resilient diaphragm is pressed during stretching against the sheet which, in its turn, is formed round or in the forming tool. When the sheet completely fits to the tool, the pressure in the pressure cell is released and the diaphragm is removed from the sheet, after which the formed component can be taken out of the press.

Another field in which presses of pressure cell type are used is wood compaction when a workpiece of wood is exposed to high pressure, either in a forming tool or on its own. Reasons for compacting wood are, for example, that it is desirable to increase the hardness of the wood, decrease the moisture content or to obtain a phase in pressure impregnation.

In traditional presses of pressure cell type, use has been made of a forged tray, in which at least the short sides of the tray are provided integrally with the bottom of a tray. The short sides and the radius transition to the bottom of the tray have to be dimensioned in such a manner that they can manage high working pressures. This means that the tray becomes unnecessarily thick and heavy.

SE 452 436 discloses a press of pressure cell type which was developed with the purpose of solving the above-mentioned problem. Said patent specification discloses a press plant having a forged, cylindrical press body which defines a press chamber. A tray which supports a forming tool and a workpiece is inserted into the press chamber. A large annular support which is arranged round the press body is adapted to absorb load being induced on the tray during a pressing operation. Each time the tray is to be taken out or inserted, the annular support has to be elevated in order to make the press chamber accessible. This is a complicated and time-consuming method.

SUMMARY OF THE INVENTION

The object of the present invention is to provide a press of pressure cell type which reduces the above-mentioned problems.

Another object of the invention is to provide a tray which, in comparison with prior-art technique, gives advantages when handling a press of pressure cell type.

These and other objects which will be evident from the following description are achieved by a press of pressure cell type, a tray and a method, which have the features indicated in the appended claims.

In the following specification, it should be understood that a "tray" according to the present invention means a device with the purpose of including a forming tool and/or a workpiece. In the traditional sense, it may thus comprise walls and a bottom plate. However, it should also comprise an essentially annular configuration which is adapted to be arranged in a detachable manner on a separate bottom plate; for example, the tray can rest on a bottom plate belonging to a press body, or a bottom plate which can be pushed in and pulled out of the press. In the detachable variant, the tray is thus tubular and has a through aperture which is defined by an annular wall configuration or tray frame. Herein, annular means a shape that forms a closed path.

In the present application, terms describing position and direction, such as "vertical" and "horizontal" are used. In the application, these terms are defined with respect to the tray arrangement. Consequently, the circumference of the tray arrangement runs horizontally, whereas its height has an extension vertically. In the application, it should also be understood that "over/upwards/above" and "under/downwards/below" are defined with respect to the main direction of the pressing, i.e. so that a press plate is located above a diaphragm which, in its turn, is located above a bottom plate. This means that vertically is defined as perpendicular to the press plate and horizontally as parallel to the press plate. The plane of a tray is thus a horizontal plane. The above-mentioned definitions have been indicated for the sake of clarity since the press of pressure cell type can be inclined in different manners and, due to this fact, the relative directions can vary.

According to one aspect of the invention, a press of pressure cell type is provided. The press comprises a force-absorbing press body which encloses a press chamber, in which press chamber a tray is arranged. The tray comprises a tray frame which defines a space for arranging a forming tool and/or a workpiece. According to the invention, prestressing means are arranged on the external surface of the tray frame and induce a compressing prestress which acts in planes parallel to the plane of the tray, i.e. essentially horizontal planes. The tray frame presents a curvature substantially along its entire circumference.

According to another aspect of the invention, a tray is provided for use in a press of pressure cell type. The tray comprises a tray frame, wherein prestressing means that induce a compressing prestress, which acts in planes parallel to the plane of the tray, are arranged on the external surface of the tray frame. The tray frame presents a curvature substantially along its entire circumference.

The present invention is thus based on the understanding that considerable improvements regarding handling and time expenditure can be provided by moving the force-absorbing function closer to the actual tray, without needing to use forged, thick trays. Consequently, the invention does not apply the known principle of improving the technique by having external means, such as an annular support, which are arranged outside the press body in order to absorb forces which are induced in the tray during the pressing. On the contrary, such external means are excluded in the present invention by prestressing means instead being integrated with the tray. According to the invention, the tray is thus adapted to independently absorb or withstand load unlike the prior-art press having the annular support. The prestressing means according to the invention allow a considerable decrease of the thickness of the tray as regards short sides or ends and radius transitions compared with a traditionally forged tray. This means that the tray according to the invention allows a greater working depth in relation to previously known forged trays and also that aspects such as manufacturing and transport of the tray are improved.

In addition to the prestressing means, the curved shape of the tray frame also conduces to the tray being able to independently absorb radial load around the whole horizontal plane. According to at least one embodiment the external surface of the tray frame is curved in its circumferential direction, while the internal surface of the tray frame, i.e. the surface that defines said space, presents straight portions in the circumferential direction. Alternatively, the internal surface of the tray frame may be curved in the circumferential direction, while the external surface of the tray frame presents straight portions in the circumferential direction. According to at least another embodiment both the internal surface and the external surface of the tray frame are curved in the circumferential direction. Within the scope of the present invention it is thus possible to provide an independently force-absorbing tray by providing at least one of said internal surface and said external surface curved in the circumferential direction of the tray frame.

The external surface of the tray frame has preferably circular shape. Alternatively, the internal surface of the tray frame has circular shape. Another possibility is that both the internal surface and the external surface have circular shape.

Instead of said circular shape the tray frame may have an elliptical or an oval shape. A further alternative is a shape of a super-ellipse, i.e. a closed curve which is something between an ellipse and a rectangle, having the equation $|x/a|^n+|y/b|^n=1$, where the exponent $n>2$.

Thanks to the fact that the at least one of said surfaces of the tray frame lacks straight portions in the circumferential direction, e.g. in accordance with one of the above mentioned shapes, such stress concentration that otherwise appear in the tray due to straight portions is avoided. The prestressing means are adapted to induce a compressing prestress on the tray in planes which are parallel to the plane of the tray, i.e. planes which are perpendicular to the main direction of the pressing. Preferably, the prestressing means are arranged on the external circumferential surface of the tray, i.e. the external surface of the tray frame, in the form of wound prestressing elements. Said plane of the tray lies preferably in parallel with a bottom plate on which a forming tool and/or a workpiece is intended to be arranged.

According to an advantageous embodiment of the press of pressure cell type, the tray comprises a number of plate-shaped lamellar means which abut against one another. Each lamellar means is annular and has a central through hole. The lamellar means which are plate-shaped are thus arranged on one another in different planes of the tray or planes of the plate and are arranged concentrically with the central holes. A workpiece, such as a metal sheet or a piece of wood, is intended to be machined in the space that is mutually formed by the holes of the concentric lamellar means.

Advantageously, the tray is prestressed in such a manner that each lamellar means is individually prestressed. This is preferably provided by a prestressing element being arranged on each lamellar means. It has turned out to be particularly advantageous to use and wind by means of a prestressing element that is band-shaped and has essentially the same width as the thickness of a lamellar means.

It is made clear by that mentioned above that the invention is also based on the understanding that, by dividing the tray arrangement into several annular parts, the manufacturing and transport of a tray are facilitated, and the handling is made easier when the press of pressure cell type is in operation. These parts or lamellar means can be assembled to a tray at the location where the press is to be used and can also be dismounted individually for further transport or storage. The dismountability also has advantages when a press plant is in operation, which will be made evident by the following description.

The tray can have a tool-holding function. In the lower portion of the space, a forming tool can be arranged having a workpiece arranged thereon. In the case of wood compaction, the forming tool can be excluded.

As already mentioned, at least one preferred embodiment of the invention comprises the features that the tray is divisible because of the fact that it comprises lamellar means of the above-described type which are dismountably arranged on one another. In connection with a pressing operation, the lowest lamellar means is preferably detachably arranged on a bottom plate in the press chamber. A diaphragm support is preferably arranged above the uppermost lamellar means, and a press plate is, in its turn, arranged above the diaphragm support. The holes in the lamellar means thus together form a space which is defined by the inner wall of the internal lamellar means, the bottom plate and a diaphragm which is placed in the diaphragm support. Depending on, for instance, working depth, one or more lamellar means can be arranged between the lowest lamellar means and the diaphragm support. Alternatively, the tray comprises only one lamellar means.

Preferably, the divisible tray is arranged in the press chamber in such a manner that the diaphragm support placed above the tray can be lifted in the direction towards the press plate. This allows a practical insertion and removal of the tray as will be described in the following. Actuating means, such as hydraulic pistons, are suitably adapted to lift the diaphragm support (and possibly also one or more lamellar means). At its upper portion, the inner diameter of the diaphragm support essentially corresponds to the circumference or diameter of the press plate and, due to this fact, the diaphragm support can be made to enclose the press plate when it is lifted upwards. It is convenient that the diaphragm support is so high that it encloses the press plate also in a non-lifted state so that satisfactory sealing is obtained during pressing.

The diaphragm support is preferably formed as a lamellar means, which as regards its appearance is essentially similar to the lamellar means comprised in the tray, and is adapted to hold a diaphragm which forms a pressure cell together with the press plate. Since the diaphragm is generally not removed or replaced as often as the workpiece is, it is an advantage if it is not necessary to remove the diaphragm support from the press when a workpiece or forming tool is to be removed from the press.

An advantage of the lifting function in the press chamber as described above is that the replacement of a workpiece or a forming tool is facilitated. Instead of lifting a heavy annular support, which is arranged outside the press, relatively high up in order to obtain access to the tray in the press chamber, it is thus sufficient to lift the diaphragm support so that a gap is provided (which does not exist when a pressing operation is carried out), the underlying lamellar means being easy to remove in the direction of the main axis of the press chamber, since there is no friction against the diaphragm support. The direction of the main axis of the press chamber is in a horizontal plane. An alternative is that the diaphragm support and one or more lamellar means are lifted up and the lamellar means which is/are positioned therebelow are taken out whereas the remaining ones are left in the press. Subsequently, the remaining lamellar means can be lowered (with or without the diaphragm support) by means of the actuating means to the bottom of the press chamber and, in a corresponding manner, these lamellar means can be lifted up to the intended position before a pressing operation.

The internal lamellar means are advantageously loosely arranged on the bottom plate and on one another; however, a type of control elements are arranged in order to ensure correct placements. Due to the fact that the internal structure of the press comprises lamellar means which are loosely arranged on one another, it is possible to easily take these out separately or several at the same time.

The divisibility of the tray arrangement results in several advantages in that the lamellar means can have several purposes; on the one hand, they may constitute a direct or indirect support for a working tool or forming tool on which for example, a metal sheet is to be shaped and, on the other, they can support or fasten various parts which are active in the press. For instance, a diaphragm which together with the press plate forms a pressure cell can be clamped between two lamellar means or the uppermost lamellar means and the press plate. Alternatively, the diaphragm can rest loosely against a shelf which protrudes from the uppermost lamellar means which corresponds to the above-described diaphragm support. A mat which is used to protect the diaphragm and is placed below the same can be fastened between two lamellar means. In a corresponding manner, the metal sheet can be fastened with the aid of suitable means. Likewise, the metal sheet becomes easily accessible after a terminated pressing operation by lifting one or more lamellar means that lie above the metal sheet.

Due to the advantageous embodiment having prestressed lamellar means which have internal surfaces, external surfaces, or both, that lack straight portions in the circumferential direction of the lamellar means, no external force absorber is needed. The press structure can therefore be made relatively open by the ends or any short sides of the press chamber wall, i.e. the external sides of the lamellar means, being accessible with the aim of inserting and removing the internal lamellar means. In the assembled press, part of the internal lamellar means will preferably protrude at the ends of the press beyond the actual press body.

The lamellar means which advantageously are used to form a tray are curved, such as for instance circular or oval as regards their shape. Each annular lamellar means comprises a wall configuration, i.e. a tray frame which defines a central hole. On certain occasions, it can be advantageous if the holes have an essentially rectangular or square cross-section in the horizontal plane, e.g. depending on the shape of the forming tool. If the internal surface of the wall configuration is curved, such as circular this is advantageously provided by means of filling blocks of resilient material, such as rubber, which are arranged to make contact with said internal surface. The purpose of the filling blocks is, among other things, to serve as support for a forming tool. If the forming tool is large enough, the filling blocks can be excluded. It is also suitable to use filling blocks in wood compaction since a workpiece has the shape of a right-angled block. In addition, the purpose of the filling blocks is to absorb and distribute forces and stress which are generated during a pressing operation. From the above it is thus clear that filling blocks are also useful when it is desirable to substantially maintain the geometrical shape of the space and the aim is only to provide further support for the tool and a force distributing function. It is also to be noted that other cross-sections than the above mentioned are possible, e.g. depending on the shape of the forming tool.

The lamellar means in the tray according to the invention can be given the desired shape by milling or cutting. Different types of cutting are possible, a few examples being water cutting, plasma cutting and flame cutting. Those skilled in the art will realise that this is a considerably simpler process than forming the traditional compact tray by forging. There will also be a great simplification as regards transport of the lamellar means which are each relatively light, in comparison with transport of trays according to prior-art technique. Preferably, the tray or the lamellar means are made of hot-rolled steel sheet which subsequently is easily given the desired shape. In the present invention, it has been found that it is suitable to use a sheet thickness of 80–200 mm, preferably 100–150 mm, especially 100–120 mm.

Due to the fact that the lamellar means are separate units which, by degrees, together are to form a tray, manufacture of them can be accelerated considerably. Thus, various lamellar means blanks can be machined in the respective stations at the same time. A first lamellar means blank can be machined in a certain station and when this lamellar means blank has been moved on to a subsequent station for further machining, a second lamellar means blank can be machined at the same time in said certain station. This parallel performing of different manufacturing steps thus turns out to be very beneficial. It is also distinctly easier to move a relatively thin lamellar means in comparison with a large traditional tray. Preferably, some stations can machine several lamellar means blanks simultaneously.

The lamellar means are easily transported to the location where the press of pressure cell type is intended to be used and assembled in situ. It has been found that the tray structure according to the invention having integrated prestressing means functions excellently at typical working pressures (such as 2000 bar) for presses of pressure cell type. Instead of making a large and heavy tray, it is possible to divide the structure into several plates which each weigh less and thus are easier to handle.

Although the tray according to the invention advantageously is used in a press chamber which is enclosed by a traditional, forged press body, it has been found to be practical to make also the press body of force-absorbing lamellar means, and because of this fact the main part of the press can be manufactured in the same way and is easy to transport in parts which are subsequently assembled at the location where the press is to be used.

It is also possible to assemble each lamellar means from two or more parts, which then by said winding of a band are connected to a coherent unit.

DETAILED DESCRIPTION OF THE DRAWINGS

Figure 1:
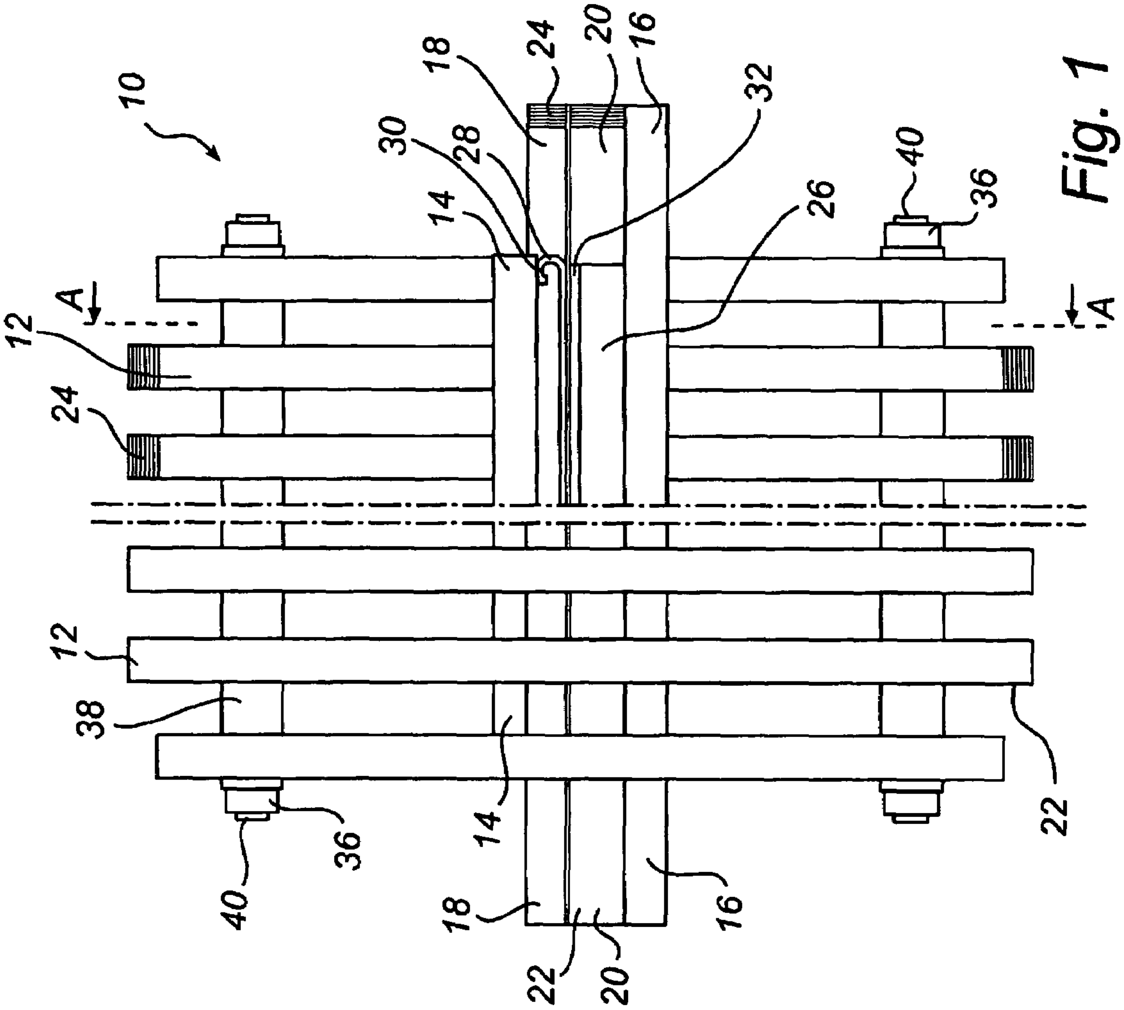
FIG. 1 is a side view, partly in cross-section, of a press of pressure cell type according to one embodiment of the present invention.

FIG. 1 is a side view (of the long side), partly in cross-section, of a press of pressure cell type 10 according to one embodiment of the present invention. A central portion of the press of pressure cell type 10 is cut out of the Figure, an ordinary side view of the press being shown to the left of the central portion and a side view in cross-section of the press being shown to the right of the central portion. The press of pressure cell type 10 is essentially made up of plate-shaped lamellar means. A force-absorbing press body is formed of external lamellar means 12 which are vertically arranged at a distance from one another. Each external lamellar means 12 has a central hole, the press body thus enclosing a press chamber in which the actual pressing operation takes place. An upper press plate 14 and a bottom plate 16 run through the central holes of the external lamellar means 12. Between these plates, a diaphragm support 18 and an internal horizontal lamellar means 20, which abut against one another, are arranged. The diaphragm support 18 is plate-shaped and annular and thus has a shape that essentially corresponds to the internal lamellar means 20. The internal lamellar means 20 rests detachably on the bottom plate 16, whereas the diaphragm support 18 is arranged so that it partly encloses the press plate 14 (shown in the right part of the figure) with the purpose of ensuring sufficient sealing.

The circumference of both the internal and the external lamellar means 12, 20 (also the diaphragm support 18) is defined by a relatively narrow, circumferential, external edge surface 22. A plurality of turns of a band 24 of spring steel are wound round the external edge surface 22 of the lamellar means 12, 20 and the diaphragm support 18, the band 24 having a width which essentially corresponds to the thickness of a lamellar means 12, 20 and a diaphragm support 18, respectively. The height of the band layer 24 of the lamellar means 12, 20 and of the diaphragm support 18 is about 100 mm and the layer can consist of one single long band or a plurality of joined pieces of band. When a lamellar means 12, 20, is being manufactured, the band 24 is wound round the same under resistance so that a compressing prestress is permanently induced in the lamellar means 12, 20. FIG. 1 shows that the tray according to the invention, i.e. the internal lamellar means 20, is without external support at the ends of the press of pressure cell type 10 since the turns of the band 24 replace that function satisfactorily. For the same reason, the diaphragm support 18 does not have an external support.

The right part in FIG. 1 is as mentioned a side view in cross-section of the press of pressure cell type 10.

The cross-section is made at the middle of the press, i.e. along the main axis of the press chamber. The right part of FIG. 1 clearly shows that both the lamellar means 12, 20 and the diaphragm support 18 are wound with a band 24 on the respective external edge surface 22. The turns of the band 24 of the internal tray-forming lamellar means 20 and the diaphragm support 18 are, according to the invention, intended to essentially permanently limit the expansion of these, i.e. they should be able to resist the forces that are formed in the press chamber. The internal lamellar means 20 is annular, which thus means that it defines an internal, open space 26, being comprised in the press chamber. A diaphragm 28 is arranged in the open space of the diaphragm support 18. The diaphragm has a seal 30 against the press plate 14 and forms a pressure cell with the same. When in operation, the pressure medium is supplied to the pressure cell in such a manner that the diaphragm 28 expands. The open space 26 of the internal lamellar means 20, which is placed below the diaphragm 18, is adapted to contain a forming tool or working tool. A metal sheet which is to be pressed against the working tool is arranged in a suitable manner above the working tool, the diaphragm 28 in connection with pressurisation being expanded and shaped on the working tool, which means that the metal sheet located therebetween also is shaped on the working tool. In addition, the Figure shows a mat 32 which is arranged just below the diaphragm 28. The mat 32 takes part in the shaping of the metal sheet and protects at the same time the diaphragm 28 against wear and tear.

The external lamellar means 12 are, apart from the central hole, each provided with four circular apertures, two above and two below the hole. The apertures are adapted to receive coupling means. Through the circular apertures in all the external lamellar means included in the press body run coupling means 36 (two of which are shown), for example a steel rod having threaded ends. The press-body-forming lamellar means 12 are kept at a distance from one another by the fact that round each coupling means 36, between the lamellar means 12, there are distance means 38 having a thickness that is as large as the desired distance between the lamellar means. The distance means 38 are made of a relatively rigid material and their inner diameter is larger than that of the coupling means 36 at the same time as their external measures are essentially larger than the apertures arranged in the lamellar means 12. At the two external ends of the coupling means 36, outside the respective external lamellar means 12 which are included in the press body, there are stop devices 40 of which at least one has a fixing and clamping mechanism which is complementary to the coupling means 36. In the case when the coupling means comprises a rod being threaded at its ends, the attaching and stressing mechanism can comprise a washer and a nut, the washer having external measures which are essentially larger than the coupling apertures of the external lamellar means. The four coupling means 36 are thus tightened to a predetermined prestress condition. This eliminates play and motion in the construction and at the same time contributes to the structural stability of the construction as regards flexural rigidity, torsional rigidity and resistance to extension in all dimensions.

A typical operating pressure inside the shown press of pressure cell type is 2000 bar.

Figure 2A:
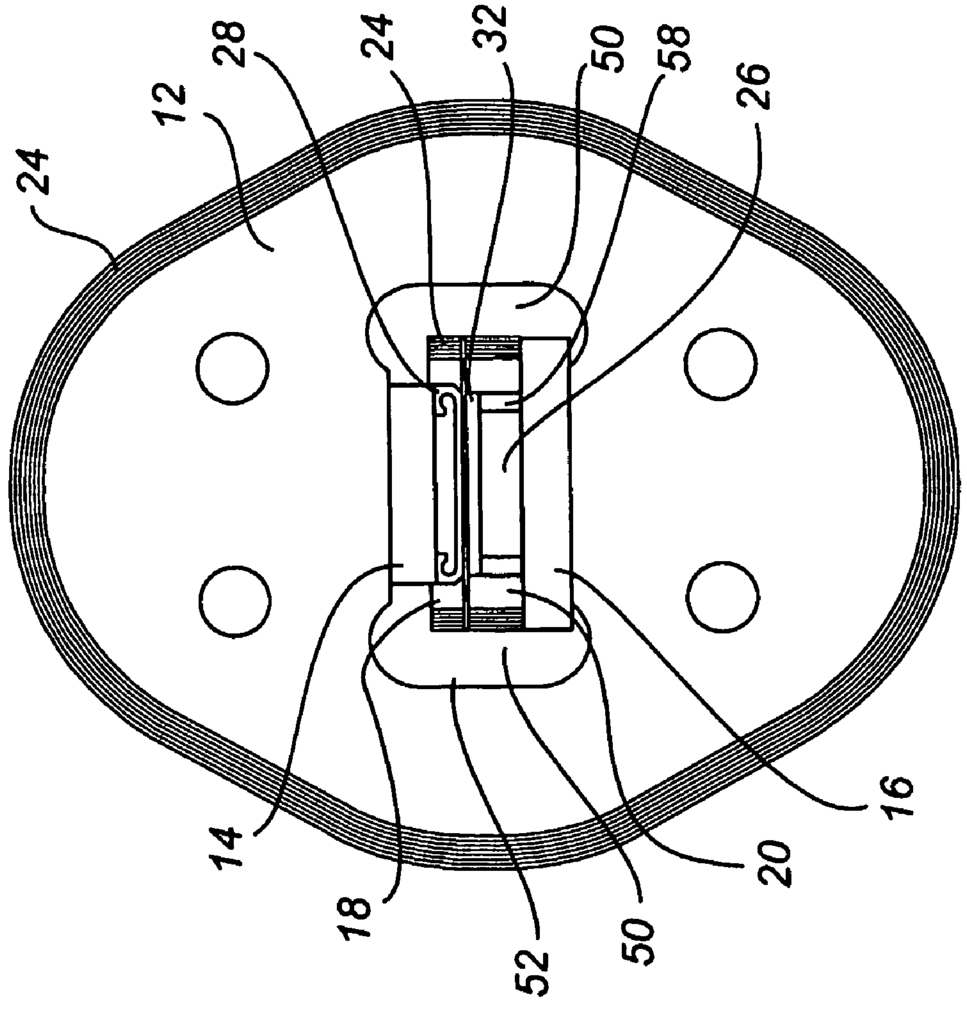
FIG. 2A shows the press of pressure cell type in cross-section along the line A—A in FIG. 1.

FIG. 2A shows the press of pressure cell type in cross-section along the line A—A in FIG. 1. The Figure shows that an external lamellar means 12 is plate-shaped. The central through holes of the external lamellar means 12 are defined by an internal edge surface. The hole is essentially quadrangular, but without actual corners. The "corner regions" are instead rounded and bend inwards into the wall so that a larger hole area is obtained. The radii of these inward bends are made relatively large with the aim of minimising the stress concentration that arises in the corner regions.

The external lamellar means 12 is essentially quadrangular and has rounded corners. The shape of the lamellar means 12 is adapted to the expected thrust which arises in connection with the pressing. Thus, the material quantity or the distance between the internal and the external edge surface is larger vertically than horizontally since the main direction of pressing is vertical.

A plurality of turns of a band 24 of spring steel are wound round the external edge surface of the external lamellar means 12, the internal lamellar means 20 and the diaphragm support 18 which are shown in FIG. 2A, the band 24 having a width which essentially corresponds to the thickness of the respective lamellar means 12, 20 (or diaphragm support 18). Each band can be one single long band or a plurality joined pieces of band.

FIG. 2A also shows that the internal lamellar means 20 and the diaphragm support 18 are not supported by an external sidewall or the like, but are surrounded by an empty space 50.

Figure 2B:
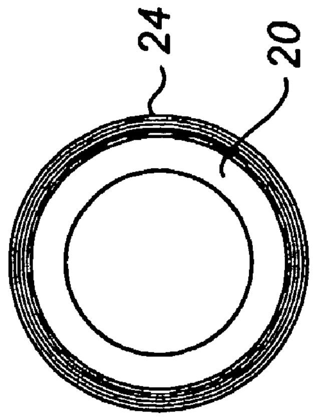
FIG. 2B is a top plan view of an internal lamellar means of the type shown in FIG. 2A.

FIG. 2B is a partial top plan view of an internal lamellar means 20 of the type shown in FIG. 2A. Thus, it is shown that this lamellar means 20 has the shape of a circle. Since the internal lamellar means 20 and the diaphragm support 18 are prestressed by the turns of the band 24, no external limiting means are required and therefore portions of the lamellar means 20 and the diaphragm support 18 can protrude from the ends of the press body as shown in FIG. 1. Since the internal tray-forming lamellar means 20 protrudes, it is relatively easily accessible, which is time-saving when metal sheets are removed, tools are replaced, diaphragms are replaced etc.

Figure 2C:
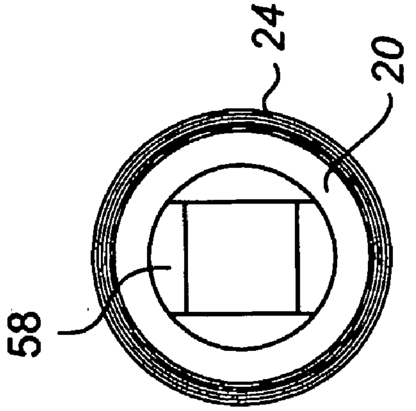
FIG. 2C shows a plan view of a lamellar means in FIG. 2A.

FIG. 2C is a partial top plan view of the internal lamellar means 20 in FIG. 2A and shows a modification of the component in FIG. 2B. The internal lamellar means 20 is at its internal surface provided with four shown filling blocks 58 made of rubber, the filling blocks being provided for distributing forces that arise during a pressing operation and for supporting a quadrangular forming or working tool.

FIGS. 3A–3E show end views of different variants of presses of pressure cell type according to the invention. The Figures thus show that the size of the external press body as well as the internal press chamber with a tray can vary. The tray can be made of different numbers of internal lamellar means, and the thickness of the lamellar means can vary. The internal dimension of the tray or load space is suitably within the range of 200 mm–2000 mm in diameter. However, it is possible to provide lamellar means having larger or smaller internal diameter.

Figure 3A:
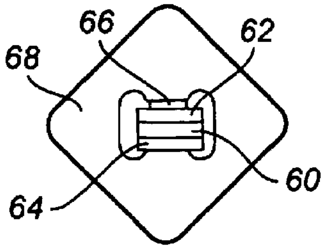
FIGS. 3A–3E are end views of different variants of presses of pressure cell type according to the invention.
Figure 3B:
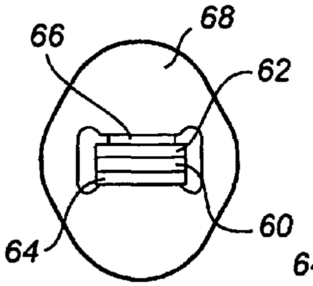
Figure 3C:
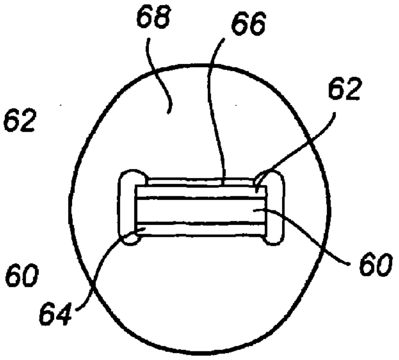

FIGS. 3A–3C illustrate some variants where an internal lamellar means 60 is arranged between a diaphragm support 62 and a bottom plate 64. A press plate 66 is arranged above the diaphragm support 62. As these Figures show, an external press-body-forming lamellar means 68 can be made in different sizes and have different shapes. The size of the internal lamellar means 60 can also vary.

Figure 3D:
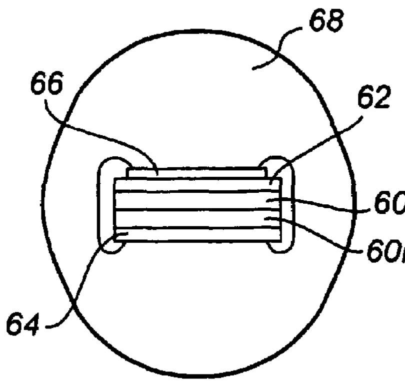

FIG. 3D shows another variant having a tray which comprises two lamellar means 60*a*, 60*b* that are arranged between the diaphragm support 62 and the bottom plate 64.

Figure 3E:
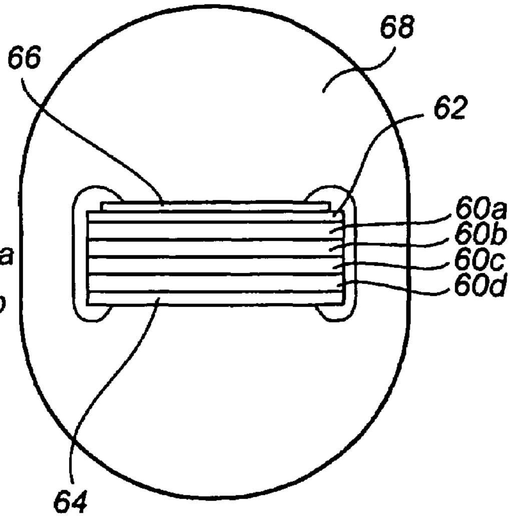

FIG. 3E shows a variant having a tray which comprises four lamellar means 60*a*, 60*b*, 60*c*, 60*d* that are arranged between the diaphragm support 62 and the bottom plate 64.

Figure 4A:
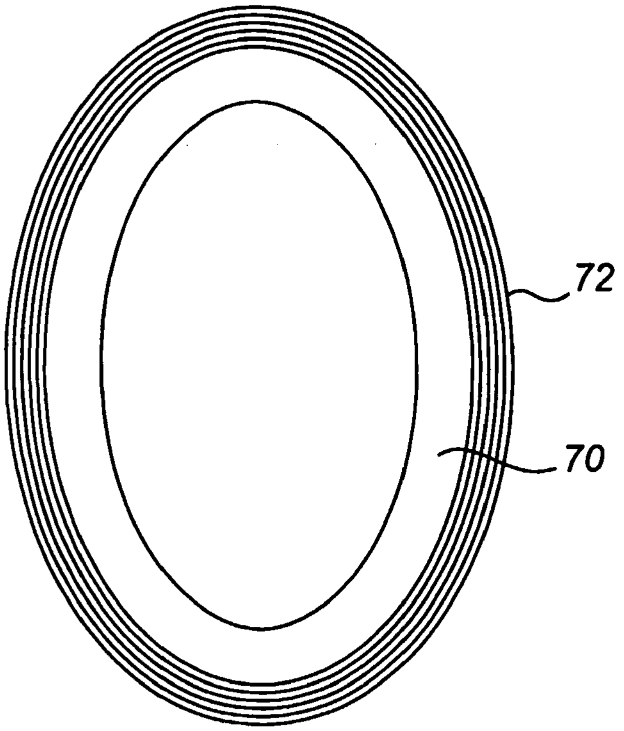
FIGS. 4A–4B illustrate alternative geometrical shapes for a tray frame.
Figure 4B:
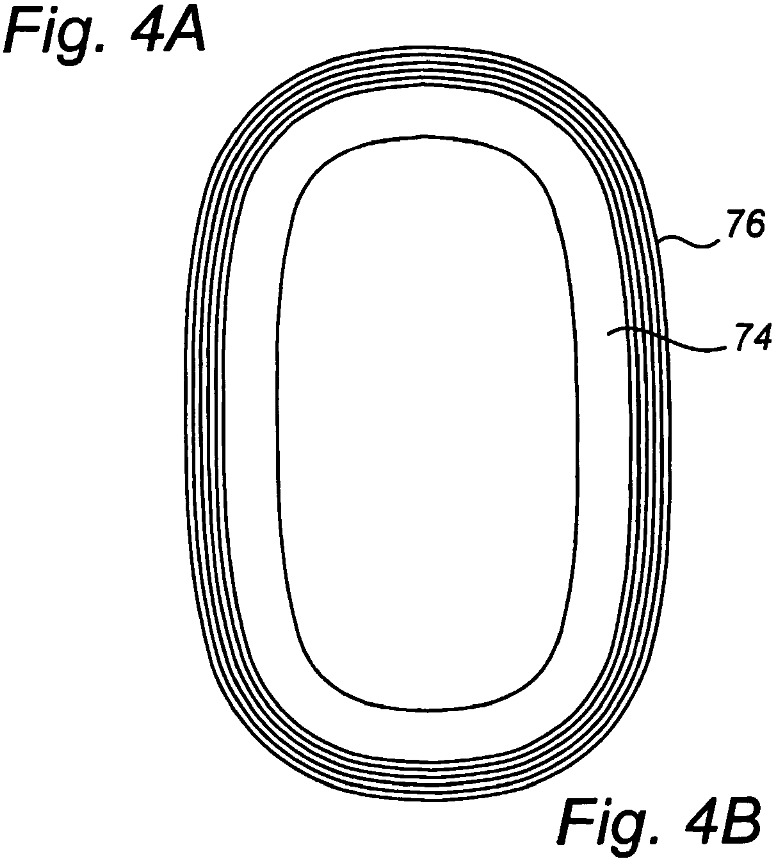

FIGS. 4A–4B illustrate alternative geometrical shapes for a tray frame or an internal lamellar means. Thus, FIG. 4A shows an internal lamellar means 70 for a tray according to at least one embodiment of the invention, the lamellar means describing an ellipse and thus encloses an oval space. The lamellar means 70 is provided with turns of a band 72 in the corresponding manner as previously discussed. FIG. 4B shows an alternative internal lamellar means 74 with turns of a band 76. This internal lamellar means has the shape of a super-ellipse, i.e. a closed curve having the equation $|x/a|^n + |y/b|^n = 1$, where the exponent n>2. These lamellar means, as well as the ones shown in FIGS. 2B and 2C, are thus circumferentially curved and provided with prestress for enabling independent force-absorbing function during a pressing operation.

Although some preferred embodiments have been described above, the invention is not limited thereto. For example, separate lamellar means and the diaphragm support can be varied in accordance with the current needs. In the figures the internal as well as the external surfaces of the lamellar means have been shown curved along the entire circumference. As an alternative to this, the invention also offers the possibility of having only one of said surfaces of the lamellar means curved along the entire circumference. Another alternative is that both said surfaces are curved, but not concentric, i.e. different amount of material may be present at different portions around a lamellar means. It should thus be understood that a plurality of modifications and variations can be provided without deviating from the scope of the present invention which is defined in the appended claims.

The invention claimed is:

1. A press of pressure cell type, comprising a tray and a force-absorbing press body, wherein the press body encloses a press chamber, into which a tray is introducible, and the tray comprises a tray frame which defines a space for arranging at least one of a forming tool and a workpiece, wherein prestressing means, which induce a compressing prestress which acts in planes parallel to the plane of the tray, are arranged on the external surface of the tray frame, and wherein the tray frame presents a curvature along its entire circumference.

2. The press of pressure cell type as claimed in claim 1, wherein the external surface of the tray frame is entirely curved in the circumferential direction of the tray frame while the internal surface of the tray frame, defining said space presents at least one straight portion in the circumferential direction of the tray frame.

3. The press of pressure cell type as claimed in claim 1, wherein the internal surface of the tray frame defining said space is entirely curved in the circumferential direction of the tray frame, while the external surface of the tray frame presents at least one straight portion in the circumferential direction of the tray frame.

4. The press of pressure cell type as claimed in claim 1, wherein both the external surface of the tray frame and the internal surface of the tray frame defining said space are entirely curved in the circumferential direction of the tray frame.

5. The press of pressure cell type as claimed in claim 1, wherein the circumference of the tray frame has a geometrical shape chosen from the group consisting of circular, elliptical and super-elliptical.

6. The press of pressure cell type as claimed in claim 1, wherein said prestressing means comprises at least one prestressing element which is wound round the external surface of the tray frame.

7. The press of pressure cell type as claimed in claim 1, wherein said tray frame comprises at least one plate-shaped, annular lamella which has a central hole, a workpiece being adapted to be machined in the space which is formed by the central hole.

8. The press of pressure cell type as claimed in claim 1, wherein the tray comprises a number of concentric, plate-shaped, annular lamellas which abut against one another, each have a central through hole and are located in planes that are parallel to the plane of the tray, a workpiece being adapted to be machined in the space which is mutually formed by the holes of the concentric lamellas.

9. The press of pressure cell type as claimed in claim 6, wherein said tray frame comprises at least one plate-shaped, annular lamella having a central hole a workpiece being adapted to be machined in the space which is formed by the central hole, and said at least one prestressing element being band-shaped and having substantially the same width as the thickness of lamella, each lamella being provided with a prestressing element.

10. The press of pressure cell type as claimed in claim 8, wherein said lamellas are detachable from one another.

11. The press of pressure cell type as claimed in claim 7, wherein the lowest lamella is detachably arranged on a bottom plate in the press chamber.

12. The press of pressure cell type as claimed in claim 7, wherein a diaphragm support for holding a diaphragm is arranged above and, when pressing the workpiece, in abutment against the uppermost lamella in such a manner that the diaphragm together with a press plate, which is arranged in the upper portion of the press chamber, forms a pressure cell, the diaphragm in connection with the supply of pressure medium to the pressure cell being adapted to exert a forming pressure on the workpiece arranged below.

13. The press of pressure cell type as claimed in claim 12, which is designed with such dimensions that at least the diaphragm support, and optionally at least one lamella, is liftable with the purpose of accessing the underlying lamellas inside the press chamber, at least one of said underlying lamellas being removable from the press chamber while the diaphragm support and any remaining lamellas are left inside the press chamber.

14. The press of pressure cell type as claimed in claim 11, wherein the remaining lamellas are removable from the press chamber when the press chamber is free from said underlying lamellas.

15. The press of pressure cell type as claimed in claim 1, wherein the tray is made of hot-rolled steel plate.

16. The press of a pressure cell type as claimed in claim 6, wherein the tray comprises a number of concentric, plate-shaped, annular lamellas which abut against one another, each have a central through hole and are located in planes that are parallel to the plane of the tray, a workpiece being adapted to be machined in the space which is mutually formed by the holes of the concentric lamellas, and said at least one prestressing element being band-shaped and having substantially the same width as the thickness of a lamella, each lamella being provided with a prestressing element.

17. The press of pressure cell type as claimed in claim 16, wherein said lamellas are detachable from one another.

18. A tray for use in a press of pressure cell type, the tray comprising:

a tray frame which defines a space with the purpose of arranging at least one of a forming tool and a workpiece, and prestressing means, which induce a compressing prestress which acts in planes parallel to the plane of the tray, arranged on the external surface of the tray frame, wherein the tray frame presents a curvature along its entire circumference.

19. The tray as claimed in claim 18, wherein the external surface of the tray frame is entirely curved in the circumferential direction of the tray frame, while the internal surface of the tray frame defining said space presents at least one straight portion in the circumferential direction of the tray frame.

20. The tray as claimed in claim 18, wherein the internal surface of the tray frame defining said space is entirely curved in the circumferential direction of the tray frame, while the external surface of the tray frame presents at least one straight portion in the circumferential direction of the tray frame.

21. The tray as claimed in claim 18, wherein both the external surface of the tray frame and the internal surface of the tray frame defining said space are entirely curved in the circumferential direction of the tray frame.

22. The tray as claimed in claim 18, wherein the circumference of the tray frame has a geometrical shape chosen from the group consisting of circular, elliptical and super-elliptical.

23. The tray as claimed in claim 18, wherein said prestressing means comprises at least one prestressing element which is wound round the external surface of the tray frame.

24. The tray as claimed in claim 18, wherein said tray frame comprises at least one plate-shaped, annular lamella which has a central hole, a workpiece being adapted to be machined in the space which is formed by the central hole.

25. The tray as claimed in claim 18, which comprises a number of concentric, plate-shaped, annular lamellas which abut against one another, each have a central through hole and are located in planes that are parallel to the plane of the tray, a workpiece being adapted to be machined in the space which is mutually formed by the holes of the concentric lamellas.

26. The tray as claimed in claim 23, wherein said tray frame comprises at least one plate-shaped, annular lamella which has a central hole, a workpiece being adapted to be machined in the space which is formed by the central hole, said at least one prestressing element being band-shaped and having substantially the same width as the thickness of a lamella, each lamella being provided with a prestressing element.

27. The tray as claimed in claim 23, wherein two lamellas which abut against one another are formed in such a manner that a workpiece, which extends transversely to said space, is kept in position when these two lamellas have been joined.

28. The tray as claimed in claim 18, wherein the tray is made of hot-rolled steel plate.

29. The tray as claimed in claim 23, which comprises a number of concentric, plate-shaped, annular lamellas which abut against one another, each have a central through hole and are located in planes that are parallel to the plane of the tray, a workpiece being adapted to be machined in the space which is mutually formed by the holes of the concentric lamellas, said at least one prestressing element being band-shaped and having substantially the same width as the thickness of a lamella, each lamella being provided with a prestressing element.

30. A method for manufacturing a tray for use in a press of pressure cell type, comprising the steps of:

forming the tray of steel plate, the tray comprising a tray frame, wherein the tray frame is formed such that it presents a curvature along its entire circumference; and inducing a remaining compressing prestress in the tray, the prestress acting in planes parallel to the plane of the tray.

31. The method as claimed in claim 30, wherein an external surface of the tray frame is formed to be entirely curved in the circumferential direction of the tray frame while an internal surface of the tray frame, is formed to present at least one straight portion in the circumferential direction of the tray frame.

32. The method as claimed in claim 30, wherein an internal surface of the tray frame is formed to be entirely curved in the circumferential direction of the tray frame while an external surface of the tray frame is formed to present at least one straight portion in the circumferential direction of the tray frame.

33. The method as claimed in claim 30, wherein both an external surface of the tray frame and an internal surface of the tray frame are formed to be entirely curved in the circumferential direction of the tray frame.

34. The method as claimed in claim 30, wherein the circumference of the tray frame is given a geometrical shape chosen from the group consisting of circular, elliptical and super-elliptical.

35. The method as claimed in claim 30, wherein the step of forming the tray comprises the steps of:

forming plate-shaped lamellas of steel plate;

providing each of said lamellas with a through hole; and arranging each lamella with the plane of the plate oriented parallel to the plane of the plate of a concentrically abutting lamellar means, a workpiece being adapted to be machined in the space which is mutually formed by the holes of the concentric lamellar means.

36. The method as claimed in claim 35, wherein prestressing elements are wound round the external surface of the lamellas with the purpose of providing said prestressing.

37. The method as claimed in claim 36, wherein a prestressing element is used, which is band-shaped and has substantially the same width as the thickness of a lamella.

38. The method as claimed in claim 35, comprising the step of giving the lamellar means the desired shape using a machining step selected from the group consisting of milling, cutting, water cutting, plasma cutting, and flame cutting.

39. The method as claimed in claim 35, comprising the step of making the lamellas of steel plate having a thickness of 80–200 mm.

40. The method as claimed in claim 35, comprising the step of making the lamellas of steel plate having a thickness of 100–150 mm.

41. The method as claimed in claim 35, comprising the step of making the lamellas of steel plate having a thickness of 100–120 mm.

* * * * *